(12) United States Patent
Wang et al.

(10) Patent No.: US 9,449,271 B2
(45) Date of Patent: *Sep. 20, 2016

(54) CLASSIFYING RESOURCES USING A DEEP NETWORK

(71) Applicant: Google Inc., Mountain View, CA (US)

(72) Inventors: Qingzhou Wang, Santa Clara, CA (US); Yu Liang, Santa Clara, CA (US); Ke Yang, Cupertino, CA (US); Kai Chen, San Bruno, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,274

(22) Filed: Aug. 24, 2015

(65) Prior Publication Data

US 2016/0048754 A1    Feb. 18, 2016

Related U.S. Application Data

(63) Continuation of application No. 13/802,462, filed on Mar. 13, 2013, now Pat. No. 9,147,154.

(51) Int. Cl.
*G06F 15/18*    (2006.01)
*G06E 1/00*    (2006.01)
(Continued)

(52) U.S. Cl.
CPC ............... *G06N 3/04* (2013.01); *G06F 3/0484* (2013.01); *G06F 17/3053* (2013.01); *G06F 17/30707* (2013.01); *G06F 17/30864* (2013.01);
(Continued)

(58) Field of Classification Search
USPC ........................................................ 706/20
See application file for complete search history.

(56) References Cited

U.S. PATENT DOCUMENTS 6,044,375 A    3/2000    Shumeli et al.
7,895,148 B2    2/2011    Ma et al.
(Continued)

FOREIGN PATENT DOCUMENTS

WO    2009/111212    9/2009

OTHER PUBLICATIONS

Deep Quantum Networks for Classification Shusen Zhou; Qingcai Chen; Xiaolong Wang Pattern Recognition (ICPR), 2010 20th International Conference on Year: 2010 pp. 2885-2888, DOI: 10.1109/ICPR.2010.707 IEEE Conference Publications.*

(Continued)

*Primary Examiner* — Michael B Holmes
(74) *Attorney, Agent, or Firm* — Fish & Richardson P.C.

(57) ABSTRACT

Methods, systems, and apparatus, including computer programs encoded on computer storage media, for scoring concept terms using a deep network. One of the methods includes receiving an input comprising a plurality of features of a resource, wherein each feature is a value of a respective attribute of the resource; processing each of the features using a respective embedding function to generate one or more numeric values; processing the numeric values using one or more neural network layers to generate an alternative representation of the features, wherein processing the floating point values comprises applying one or more non-linear transformations to the floating point values; and processing the alternative representation of the input using a classifier to generate a respective category score for each category in a pre-determined set of categories, wherein each of the respective category scores measure a predicted likelihood that the resource belongs to the corresponding category.

20 Claims, 3 Drawing Sheets

Figure 1:
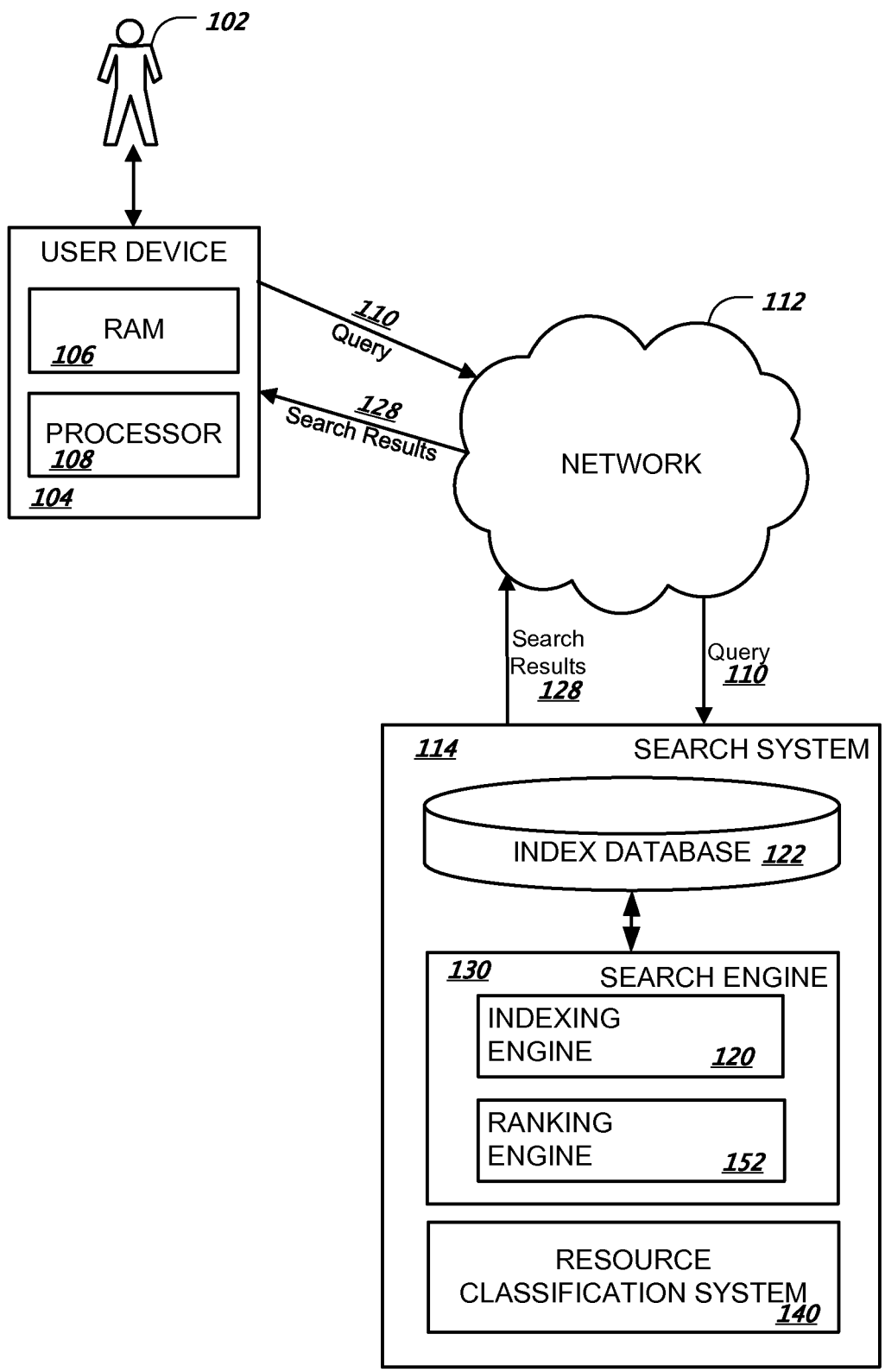

(51) Int. Cl.
| | |
|---|---|
| G06E 3/00 | (2006.01) |
| G06G 7/00 | (2006.01) |
| G06N 3/04 | (2006.01) |
| G06N 3/02 | (2006.01) |
| G06F 17/30 | (2006.01) |
| G06N 3/08 | (2006.01) |
| G06K 9/62 | (2006.01) |
| G06F 3/0484 | (2013.01) |
| G06N 7/00 | (2006.01) |

(52) U.S. Cl.
CPC ............... *G06K9/627* (2013.01); *G06N 3/02* (2013.01); *G06N 3/0427* (2013.01); *G06N 3/084* (2013.01); *G06N 7/005* (2013.01)

(56) References Cited

U.S. PATENT DOCUMENTS

| | | | |
|---|---|---|---|
| 8,180,754 B1 | 5/2012 | Ershov | |
| 8,768,870 B1 | 7/2014 | Corrado et al. | |
| 9,015,245 B1* | 4/2015 | Lee | H04L 29/06476 709/203 |
| 9,037,464 B1* | 5/2015 | Mikolov | G06F 17/2785 704/255 |
| 9,112,870 B1* | 8/2015 | Yee | H04L 65/1003 |
| 9,141,906 B2* | 9/2015 | Chen | G06N 3/08 |
| 9,141,916 B1* | 9/2015 | Corrado | G06N 3/0454 |
| 9,146,993 B1* | 9/2015 | Chen | G06F 17/30864 |
| 9,147,154 B2* | 9/2015 | Wang | G06N 3/02 |
| 9,210,399 B1* | 12/2015 | Chi | G02B 27/017 |
| 9,213,185 B1* | 12/2015 | Starner | G06T 19/006 |
| 9,218,573 B1* | 12/2015 | Corrado | G06N 99/005 |
| 9,256,892 B2* | 2/2016 | Kniaz | G06Q 30/02 |
| 9,269,048 B1* | 2/2016 | Chen | G06N 5/048 |
| 9,323,417 B2* | 4/2016 | Sun | H04N 7/142 |
| 2003/0225763 A1 | 12/2003 | Guilak et al. | |
| 2007/0250301 A1 | 10/2007 | Vaisberg et al. | |
| 2007/0291002 A1 | 12/2007 | Yao et al. | |
| 2009/0171232 A1 | 7/2009 | Hu et al. | |
| 2013/0066814 A1 | 3/2013 | Bosch et al. | |
| 2014/0279773 A1 | 9/2014 | Chen et al. | |
| 2014/0279774 A1 | 9/2014 | Wang et al. | |

OTHER PUBLICATIONS

Interaction Style Recognition Based on Multi-layer Multi-view Profile Representation Wen-Li Wei; Jen-Chun Lin; Chung-Hsien Wu IEEE Transactions on Affective Computing Year: 2016, vol. PP, Issue: 99 pp. 1-1, DOI: 10.1109/TAFFC.2016.2553024 IEEE Early Access Articles.*

Robust Joint Graph Sparse Coding for Unsupervised Spectral Feature Selection Xiaofeng Zhu; Xuelong Li; Shichao Zhang; Chunhua Ju; Xindong Wu IEEE Transactions on Neural Networks and Learning Systems Year: 2016, vol. PP, Issue: 99 pp. 1-13, DOI: 10.1109/TNNLS.2016.2521602 IEEE Early Access Articles.*

Automated Induction of Heterogeneous Proximity Measures for Supervised Spectral Embedding Eduardo Rodriguez-Martinez; Tingting Mu; Jianmin Jiang; John Yannis Goulermas IEEE Transactions on Neural Networks and Learning Systems Yr: 2013, vol. 24, Issue: 10 pp. 1575-1587, DOI: 10.1109/TNNLS.2013.2261613 IEEE Journals & Magazines.*

Dean et al., "Large Scale Distributed Deep Networks," Advances in Neural Information Processing Systems 25, Neural Information Processing Systems Conference (NIPS), Dec. 2012; Retrieved from the Internet: < URL: http://papers.nips.cc/paper/4687-large-scale-distributed-deep-networks.pdf, 11 pages.

Salakhutdinov and Hinton, "Semantic Hashing," International Journal of Approximate Reasoning 50(7):969-978, Jul. 2009, published online Dec. 10, 2008.

Min et al., "A Deep Non-linear Feature Mapping for Large-Margin kNN Classification," Ninth IEEE International Conference on Data Mining, 2009 (ICDM '09), Dec. 6, 2009, pp. 357-366.

Erdélyi et al., "Web Spam Classification: a Few Features Worth More," Web Quality, Hyderabad, India, Mar. 28, 2011, pp. 27-34.

International Search Report and Written Opinion in International Application No. PCT/US2014/026226, mailed Aug. 6, 2014, 12 pages.

Kashiwagi et al., "Discriminative Piecewise Linear Transformation Based on Deep Learning for Noise Robust Automatic Speech Recognition," Automatic Speech Recognition and Understanding (ASRU), 2013 IEEE Workshop on DOI: 10.1109/ASRU.2013.6707755 Publication Year: 2013, pp. 350-355.

Kaisheng et al., "Adaptation of Context-dependent Deep Neural Networks for Automatic Speech Recognition," Spoken Language Technology Workshop (SLT), 2012 IEEE DOI: 10.1109/SLT.2012.6424251 Publication Year: 2012, pp. 366-369.

Xiaoyi et al., "High Speed Deep Networks Based on Discrete Cosine Transformation," Image Processing (ICIP), 2014 IEEE International Conference on DOI: 10.1109/ICIP.2014.7026196 Publication Year: 2014, pp. 5921-5925.

Mohamed et al., "Understanding How Deep Belief Networks Perform Acoustic Modelling," Speech and Signal Processing (ICASSP), 2012 IEEE International Conference on DOI: 10.1109/ICASSP.2012.6288863 Publication Year: 2012, pp. 4273-4276.

* cited by examiner

CLASSIFYING RESOURCES USING A DEEP NETWORK

CROSS-REFERENCE TO RELATED APPLICATION

This application is a continuation of U.S. application Ser. No. 13/802,462, filed on Mar. 13, 2013, the disclosure of which is hereby incorporated by reference in its entirety.

BACKGROUND

This specification relates to classifying resources into categories.

Internet search engines aim to identify resources, e.g., web pages, images, text documents, or multimedia content, that are relevant to a user's needs and to present information about the resources in a manner that is most useful to the user. Internet search engines generally return a set of search results, each of which identifies a resource, in response to a user submitted query.

SUMMARY

In general, one innovative aspect of the subject matter described in this specification can be embodied in methods that include the actions of receiving an input comprising a plurality of features of a resource, wherein each feature is a value of a respective attribute of the resource; processing each of the features using a respective embedding function to generate one or more numeric values; processing the numeric values using one or more neural network layers to generate an alternative representation of the features of the resource, wherein processing the floating point values comprises applying one or more non-linear transformations to the floating point values; and processing the alternative representation of the input using a classifier to generate a respective category score for each category in a pre-determined set of categories, wherein each of the respective category scores measure a predicted likelihood that the resource belongs to the corresponding category.

Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. Each of the embedding functions can be specific to features of a respective feature type. The pre-determined set of categories can include a search engine spam category, and the category score for the resource measures a predicted likelihood that the resource is a search engine spam resource. The pre-determined set of categories can include a respective category for each of a plurality of types of search engine spam. The pre-determined set of categories includes a respective category for each resource type in a group of resource types. The method can further include providing the category scores to a search system for use in determining whether or not index resources in a search engine index. The method can further include providing the category scores to a search system for use in generating and ordering search results in response to received search queries. The numeric values can be floating point values. The numeric values can be quantized integer values, and an encoding of the quantized integer values can represent floating point values.

Particular embodiments of the subject matter described in this specification can be implemented so as to realize one or more of the following advantages. A deep network can be effectively used to classify resources into categories. For example, resources can be effectively classified as being spam or not spam, as being one of several different types of spam, or as being one of two or more resource types. Using the deep network to classify resources into categories may result in a search engine being able to better satisfy users' informational needs, e.g., by effectively detecting spam resources and refraining from providing search results identifying those resources to users or by providing search results that identify resources that belong to categories that better match the user's informational needs. Using the deep network to classify results into categories may provide an accurate and efficient way to verify user claims about resources, e.g., a user claim that a resource belongs to a particular category and has incorrectly been classified as belonging to a different category.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 shows an example search system.

FIG. 2 is a block diagram of an example resource classification system.

FIG. 3 is a flow diagram of an example process for classifying a resource.

Like reference numbers and designations in the various drawings indicate like elements.

DETAILED DESCRIPTION

FIG. 1 shows an example search system 114. The search system 114 is an example of an information retrieval system implemented as computer programs on one or more computers in one or more locations, in which the systems, components, and techniques described below can be implemented.

A user 102 can interact with the search system 114 through a user device 104. The user device 104 will generally include a memory, e.g., a random access memory (RAM) 106, for storing instructions and data and a processor 108 for executing stored instructions. The memory can include both read only and writable memory. For example, the user device 104 can be a computer coupled to the search system 114 through a data communication network 112, e.g., local area network (LAN) or wide area network (WAN), e.g., the Internet, or a combination of networks, any of which may include wireless links.

In some implementations, the search system 114 provides a user interface to the user device 104 through which the user 102 can interact with the search system 114. For example, the search system 114 can provide a user interface in the form of web pages that are rendered by a web browser running on the user device 104.

A user 102 can use the user device 104 to submit a query 110 to a search system 114. A search engine 130 within the search system 114 performs a search to identify resources matching the query. When the user 102 submits a query 110, the query 110 may be transmitted through the network 112 to the search system 114. The search system 114 includes an index database 122 and the search engine 130. The search system 114 responds to the query 110 by generating search results 128, which are transmitted through the network to the user device 104 for presentation to the user 102, e.g., as a search results web page to be displayed by a web browser running on the user device 104.

In this specification, the term "database" will be used broadly to refer to any collection of data: the data does not need to be structured in any particular way, or structured at all, and it can be stored on multiple storage devices in one or more locations. Thus, for example, the index database 122 can include multiple collections of data, each of which may be organized and accessed differently. Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

When the query 110 is received by the search engine 130, the search engine 130 identifies resources that satisfy the query 110. The search engine 130 will generally include an indexing engine 120 that indexes resources, an index database 122 that stores the index information, and a ranking engine 152 or other software that generates scores for the resources that satisfy the query 110 and that ranks the resources according to their respective scores.

The search system 114 also includes or can communicate with a resource classification system 140 that classifies resources into pre-determined categories. The search system 114 can use the classifications generated by the resource classification system 140 in any of a variety of ways, e.g., in determining whether to index a resource in the index database 122 or in generating search results in response to the query 110. An example resource classification system and an example process for classifying a resource into a pre-determined category are described below with reference to FIGS. 2 and 3.

Figure 2:
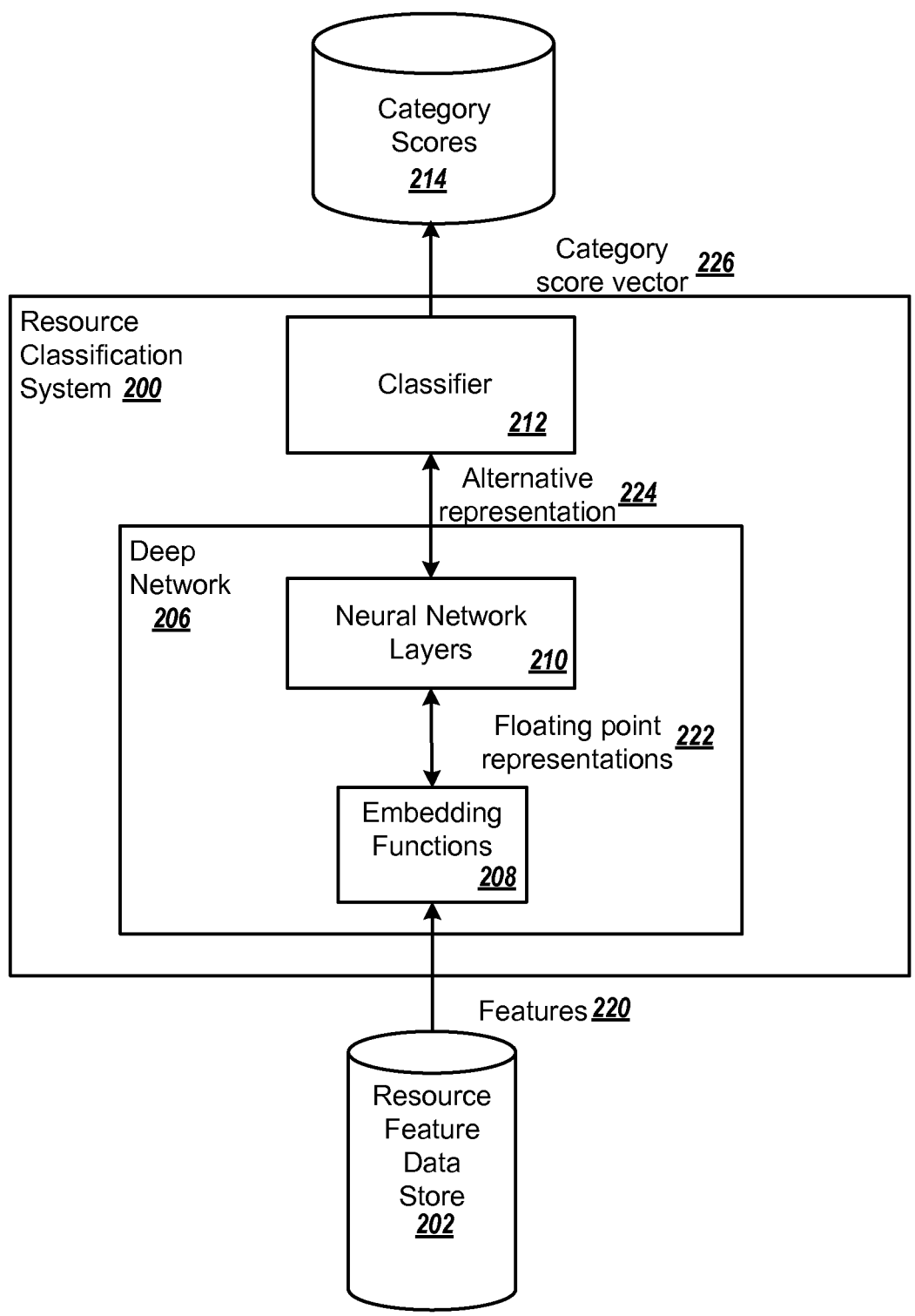

FIG. 2 is a block diagram of an example resource classification system 200. The resource classification system 200 is an example of a system implemented as computer programs on one or more computers in one or more locations, in which the systems, components, and techniques described below can be implemented.

The resource classification system 200 receives an input and generates a predicted output based on the received input. In particular, the input is a set of features of a resource and the output generated by the resource classification system 200 based on the received set of features is a respective score for each of a set of pre-determined categories. Each score generated for each of the categories is a prediction of how likely it is that the resource belongs to the corresponding category.

For example, in some implementations, the resource classification system 200 classifies resources as search engine spam resources or not search engine spam resource, i.e., the categories in the set of pre-determined categories are a "spam" category and a "not spam" category.

A search engine spam resource is a resource provided to a search system, e.g., provided to the search system 114 of FIG. 1 for indexing in the index database 122, that has been manipulated by a person or a group of people, who may individually or collectively be referred to as a spammer, to give the resource a high search engine ranking as a response to one or more queries, which the resource would not legitimately have. For example, content in a resource may be made to appear particularly relevant to a specific geographic area, and so be highly ranked for queries directed to that area, when in fact the content refers to a business, for example, that has no place of business in the area. Search engine spam can include other forms of erroneous information as well. Search engine spam may also be referred to in this specification as spam content or simply as spam, when the meaning is clear from the context.

In these implementations, the resource classification system 200 can generate a score that is a predicted likelihood that the resource is a spam resource, i.e., belongs to the spam category.

In some other implementations, the resource classification system 200 classifies resources as being either not spam or one of various types of search engine spam, i.e., the categories in the set of pre-determined categories are a "not spam" category and a respective category for each type of spam. For example, the types of search engine spam can include resources that include content spam, resources that include link spam, cloaking spam resources, and so on. In these implementations, the system can generate a score for each category that represents a predicted likelihood that the resource belongs to that category.

In some other implementations, the resource classification system 200 classifies resources according to a pre-determined group of resource types. For example, the resource types may include any of news resources, blog resources, forum resources, shopping resources, product resources, and so on. Depending on the resource types in the pre-determined group of resource types, a resource may be classified as belonging to more than one of the pre-determined groups. For example, if the resource types include political resources and blog resources, a blog about an election or a political debate may be classified as being both a political resource and a blog resource. In these implementations, the set of pre-determined categories includes a respective category for each resource type in the group.

The features of the resource are values of respective attributes of the resource that characterize the resource in some way and can include features of multiple respective categorically distinct feature types. A feature of a particular type is a list of one or more active feature elements, i.e., a list of tokens or of token-value pairs, selected from a vocabulary of possible feature elements of the feature type. For example, the tokens may be words in a natural language, e.g., English, and the vocabulary for the feature type may be the known words in the natural language. The vocabularies for the feature types may be overlapping or non-overlapping and the list for a given feature type may be ordered or unordered.

For example, the resource classification system 200 can receive features 220 of a resource from a feature data store 202. The features 220 are features that have been extracted from the resource. In particular, the features of the resource include tokens from the content of the resource. Optionally, the tokens are associated with labels, with each label corresponding to a specific portion of the resource in which the token appears, e.g., the title of the resource, the header of the resource, a link in the resource, and so on. Further optionally, the features of the resource can include features of other types, e.g., any of: the uniform resource locator (URL) of the resource, the domain name of the resource, the age of the resource, a length of the resource. In some implementations, the features also include data obtained by the resource classification system 200 that identifies the categories or entity types that are relevant to the resource. The features of the resource can also include features obtained from other systems or services that summarize the content or the utility of the resource, e.g., systems that attempt to identify the most important terms in the resource, systems that identify entities that are relevant to the resource, and so on.

The resource classification system 200 uses the received input features to predict an output, i.e., a vector of scores that includes a respective score for each category of the set of categories. The output can be provided to a search system, e.g., the search system 114 of FIG. 1, or stored in a category score data store 214 for later use by the search system. The search system can make use of the generated scores in any of a variety of ways. In some implementations, the search system uses the category scores for a given resource in determining whether or not to index the resource in an index database. For example, when the scores represent a likelihood that a resource is a search engine spam resource, the search system can use the score in a decision process so that a resource that is more likely to be spam is less likely to be indexed in the index database. As another example, when the scores represent likelihoods that a resource is one of several different types of search engine spam, the search system can determine that resources having a score that exceeds a threshold score for one of the types not be indexed in the index database.

In some other implementations, the search system can make use of the generated scores in generating search results for particular queries. For example, when the scores represent a likelihood that a resource is a search engine spam resource, the search system can use the score for a given resource to determine whether or not to remove a search result identifying the resource before providing the search results for presentation to the user or to demote the search result identifying the resource in an order of the search results. Similarly, when the scores represent a likelihood that a resource belongs to one of a pre-determined group of resource types, the search system can use the scores to promote or demote search results identifying the resource in an order of search results generated in response to particular search queries, e.g., search queries that have been determined to be seeking resources of a particular type.

In some other implementations, when the scores represent a likelihood that a resource belongs to one of a pre-determined group of resource types, the search system can make use of the generated scores in verifying user statements about resources. For example, the search system may provide users the option to identify resources that have been incorrectly classified by the search system. For example, a user may be able to submit a statement that a search result identifying a product resource has been included in a listing of news search results or that a blog resource that has a review of a product has been included in a listing of shopping resources from which the product may be purchased. When a user statement about a resource is received, the system can make use of the generated scores for the resource in evaluating the likelihood that the resource has been misclassified and determining whether to adjust the classification of the resource.

The resource classification system 200 includes a deep network 206 and a classifier 212. The deep network 206 is a machine learning system that includes a set of embedding functions 208 and one or more hidden neural network layers 210, each having a respective set of parameters. Each of the embedding functions 208 receives a respective feature of a respective type and, in accordance with a set of embedding function parameters, applies a transformation to the feature that maps the feature into a numeric representation. For example, the embedding functions 208 can apply a transformation to the features 220 to map the features into floating point representations 222. Embedding functions will be described in more detail below with reference to FIG. 3.

An initial layer of the neural network layers 210 receives as an input the numeric representations of the input features generated by the embedding functions and the neural network layers 210 each apply one or more respective non-linear transformations to the floating point representations to generate an alternative representation of the input. For example, the neural network layers 210 can generate an alternative representation 224 from floating point representations 222 of the features 220 received from the embedding functions 208. Instead of or in addition to the neural network layers 210, the deep network 206 may include another group of layers that applies successive linear or non-linear transformations over some or all of the floating point representations generated by the embedding functions 208.

The classifier 212 receives the alternative representation generated by the deep network 206 and predicts a value for each field of a category score vector in accordance with values of classifier parameters of the classifier 212. Each of the fields in the category score vector corresponds to a respective category in the set of categories. For example, the classifier 212 can generate a category score vector 226 from the alternative representation 224. Depending on the implementation and on the number of categories in the set of categories, i.e., the number of fields for which a predicted value is generated, the classifier 212 can be either a binary classifier, e.g., a logistic regression classifier, a support vector machine classifier, a Bayesian classifier, a softmax classifier, and so on, or a multiclass or multilabel classifier, e.g., a multiclass logistic regression classifier, a multiclass support vector machine classifier, a Bayesian classifier, and so on.

Figure 3:
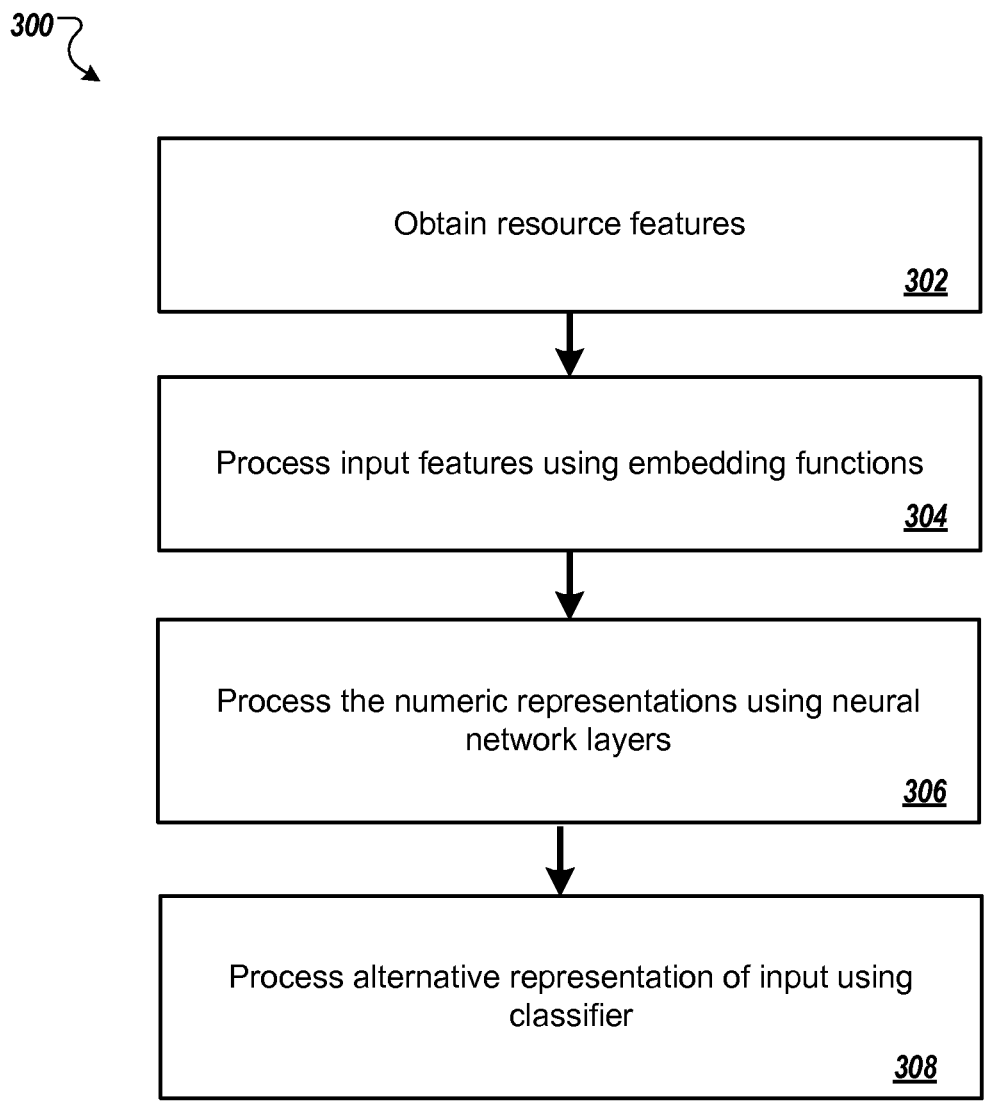

FIG. 3 is a flow diagram of an example process 300 for classifying a resource. For convenience, the process 300 will be described as being performed by a system of one or more computers located in one or more locations. For example, a resource classification system, e.g., the resource classification system 200 of FIG. 2, appropriately programmed, can perform the process 300.

The system obtains features of a resource (step 302).

The system processes each feature using the embedded function for the feature type of the feature (step 304) to generate a numeric representation of the feature. Depending on the feature type and on the implementation, the embedding function for a given feature type can be any of a variety of embedding functions. The system determines the type of the feature by parsing the raw input data received by the system for each resource. As one example, if a portion of the raw input data are the tokens "example title" with an associated label "title," the system can parse the input data to determine that one of the resource features is "example title" and that the feature is of a resource title feature type. As another example, if a portion of the raw input data for a given resource is "URL: www.examplesite.com," the system can parse the input data to determine that one of the resource features is www.examplesite.com and that the feature is of a URL feature type.

For example, for a feature type whose features are a single token, the embedding function may be a simple embedding function. A simple embedding function maps a single token to a floating point vector, i.e., a vector of floating point values. For example, the simple embedding function may map the token "cat" to a vector [0.1, 0.5, 0.2] and the token "tablet" to a vector [0.3, 0.9, 0.0], based on current parameter values of the embedding function, e.g., as stored in a lookup table.

As another example, for a feature type whose features can potentially be a list of two or more tokens, the embedding function may be a parallel embedding function. A parallel embedding function maps each token in a list of tokens to a respective floating point vector and outputs a single vector that is a concatenation of the respective floating point vectors. For example, for an ordered list of tokens {"Atlanta", "Hotel"}, the parallel embedding function may map "Atlanta" to a vector [0.1, 0.2, 0.3] and "Hotel" to [0.4, 0.5, 0.6], and then output [0.1, 0.2, 0.3, 0.4, 0.5, 0.6]. In order to obtain the respective floating point vectors, the parallel embedding function may use a single lookup table or multiple different lookup tables.

As another example, for a feature type whose features can potentially be a list of two or more tokens, the embedding function may be a combining embedding function. A combining embedding function maps each token in the list to a respective floating point vector and then merges the respective floating point vectors into a single merged vector. The combining embedding function can merge the respective floating point vector using a linear function, e.g., a sum, average, or weighted linear combination of the respective floating point vectors, or using a nonlinear function, e.g., a component-wise maximum or a norm-constrained linear combination, for example. In order to identify the respective floating point vectors, the parallel embedding function may use a single lookup table or multiple different lookup tables. For example, for the ordered list {"Atlanta", "Hotel"}, the parallel embedding function may map "Atlanta" to a vector [0.1, 0.2, 0.3] and "Hotel" to [0.4, 0.5, 0.6], and then output the sum of the two vectors, i.e., [0.5, 0.7, 0.9].

As another example, for a feature type whose features can potentially be a list of two or more tokens, the embedding function may be a mixed embedding function. A mixed embedding function maps each token in a list of tokens to a respective floating point vector and generates an initial vector that is the concatenation of the respective floating point vectors. The mixed embedding function then merges the respective floating point vectors into a merged vector and concatenates the merged vector with the initial vector. For example, for the ordered list {"Atlanta", "Hotel"}, the mixed embedding function may output a concatenation of the vectors output by the parallel embedding function and the combining embedded function, i.e., [0.1, 0.2, 0.3, 0.4, 0.5, 0.6, 0.5, 0.7, 0.9].

Depending on the implementation, the system may utilize two different kinds of embedding functions for two different feature types, and the two embedding functions may or may not share parameters. For example, the system may utilize a combining embedding function for a first feature type and a mixed embedding function for a second feature type.

If one or more of the features of the resource are not discrete, prior to processing the feature using an embedding function, the system uses a hashing function to hash each non-discrete feature. The system can then partition each hashed feature into one of a pre-determined set of partitions, and process a value corresponding to the partition using the embedding function for the feature. Additionally, if a particular feature cannot be obtained for a given resource, that system can map that feature to a pre-determined value.

In some implementations, instead of floating point values, a given embedding function may generate a different kind of numeric value. For example, the embedding function may generate quantized integer values whose encoding represents floating point values.

The system processes the numeric representations using one or more neural network layers (step 306). The one or more neural network layers include one or more layers of non-linear transformations, with each transformation being defined based on values of a respective set of parameters. In general, the one or more neural network layers generate an alternative representation of the input based on the floating-point vector representations of the features of the input. Optionally, the system can then process the alternative representation using a sparse binary output layer, e.g., a layer that outputs a vector that is 0 or 1 at every position. An example technique for processing the floating-point representations using neural network layers is described in Ruslan Salakhutdinov & Geoffrey Hinton, Semantic hashing, International Journal of Approximate Reasoning 50 (2009) 969-978. However, many different techniques and mechanisms for processing the representations using neural network layers can be used.

The system processes the alternative representation of the input using a classifier (step 308) to predict an output for each of a set of categories. The classifier predicts the output based on values of a set of parameters and the alternative representation. The output for a given category is a prediction of the value of a variable that corresponds to the category, e.g., a score for the category that represents the predicted likelihood that the resource belongs to the category. In some implementations, the system can process the alternative representation of the input using a ranking function instead of a classifier to predict a ranking of the categories according to the predicted likelihood that the resource belongs to each of the categories.

The process 300 can be performed to predict scores for an input for which the desired output is not known, i.e., for a resource for which the desired classification is not known. The process 300 can also be performed on inputs in a set of training data, i.e., a set of inputs for which the output that should be predicted by the system is known, in order to train the system, i.e., to determine optimal values for the parameters of the classifier and the deep network. For example, the process 300 can be performed repeatedly on inputs selected from a set of training data as part of a backpropagation training technique that determines optimal values for each of the parameters. Generally, the inputs in the set of training data are features of resources that have an associated category classification, i.e., that have already been classified into categories from the pre-determined set of categories.

As part of the training process, if the label predicted by the classifier for a particular resource in the set of training data is different from the known desired label for that particular training resource, i.e., the category scores generated by the classifier do not align with the category to which the resource belongs, the classifier will adjust its parameters so as to reduce the expected error on that particular input using conventional gradient based methods. Furthermore, as part of the backpropagation method, the classifier sends an error signal to the deep network, which allows the deep network to adjust the parameters of its internal components through successive stages of backpropagation.

In some circumstances, e.g., for large sets of training data, the training process can be parallelized in any of a variety of ways. For example, the training process can be parallelized using one or more of the techniques for parallelizing the training of a machine learning model described in "Large Scale Distributed Deep Networks," Jeffrey Dean, et al., Neural Information Processing Systems Conference, 2012.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving an input comprising a plurality of features of a resource, wherein each feature is a value of a respective attribute of the resource;
   generating an alternative representation of the features of the resource, comprising:
      generating a respective numeric representation of each of the features by processing each of the features using a respective embedding function, wherein each of the embedding functions is specific to features of a respective feature type, and
      processing the respective numeric representations through one or more neural network layers to generate the alternative representation of the features of the resource; and
   providing the alternative representation of the features of the resource as input to a neural network classifier for classification of the resource as belonging to one or more categories of a plurality of categories.

2. The method of claim 1, wherein the neural network classifier is configured to:
   process the alternative representation of the input to generate a respective category score for each of the plurality of categories, wherein each of the respective category scores measures a predicted likelihood that the resource belongs to the corresponding category.

3. The method of claim 2, further comprising providing the category scores to a search system for use in determining whether or not index resources in a search engine index.

4. The method of claim 2, further comprising providing the category scores to a search system for use in determining whether or not index resources in a search engine index.

5. The method of claim 2, further comprising providing the category scores to a search system for use in generating and ordering search results in response to received search queries.

6. The method of claim 1, wherein the numeric representations are vectors of floating point values.

7. The method of claim 1, wherein the numeric representations are vectors of quantized integer values, and wherein an encoding of the quantized integer values represents floating point values.

8. The method of claim 1, wherein the plurality of categories includes a search engine spam category.

9. The method of claim 1, wherein the plurality of categories includes a respective category for each of a plurality of types of search engine spam.

10. The method of claim 1, wherein the plurality of categories includes a respective category for each resource type in a group of resource types.

11. A system comprising one or more computers and one or more storage devices storing instructions that when executed by the one or more computers to perform operations comprising:
   receiving an input comprising a plurality of features of a resource, wherein each feature is a value of a respective attribute of the resource;
   generating an alternative representation of the features of the resource, comprising:
      generating a respective numeric representation of each of the features by processing each of the features using a respective embedding function, wherein each of the embedding functions is specific to features of a respective feature type, and
      processing the respective numeric representations through one or more neural network layers to generate the alternative representation of the features of the resource; and
   providing the alternative representation of the features of the resource as input to a neural network classifier for classification of the resource as belonging to one or more categories of a plurality of categories.

12. The system of claim 11, wherein the neural network classifier is configured to:
   process the alternative representation of the input to generate a respective category score for each of the plurality of categories, wherein each of the respective category scores measures a predicted likelihood that the resource belongs to the corresponding category.

13. The system of claim 12, the operations further comprising providing the category scores to a search system for use in determining whether or not index resources in a search engine index.

14. The system of claim 12, the operations further comprising providing the category scores to a search system for use in determining whether or not index resources in a search engine index.

15. The system of claim 12, the operations further comprising providing the category scores to a search system for use in generating and ordering search results in response to received search queries.

16. The system of claim 11, wherein the plurality of categories includes a search engine spam category, and the category score for the search engine spam category measures a predicted likelihood that the resource is a search engine spam resource.

17. The system of claim 11, wherein the plurality of categories includes a respective category for each of a plurality of types of search engine spam.

18. The system of claim 11, wherein the plurality of categories includes a respective category for each resource type in a group of resource types.

19. One or more non-transitory storage media encoded with a computer program, the computer program comprising instructions that when executed by one or more computers to perform operations comprising:
   receiving an input comprising a plurality of features of a resource, wherein each feature is a value of a respective attribute of the resource;
   generating an alternative representation of the features of the resource, comprising:
      generating a respective numeric representation of each of the features by processing each of the features using a respective embedding function, wherein each of the embedding functions is specific to features of a respective feature type, and
      processing the respective numeric representations through one or more neural network layers to generate the alternative representation of the features of the resource; and
   providing the alternative representation of the features of the resource as input to a neural network classifier for classification of the resource as belonging to one or more categories of a plurality of categories.

20. The computer storage media of claim 19, wherein the neural network classifier is configured to:
   process the alternative representation of the input to generate a respective category score for each of the plurality of categories, wherein each of the respective category scores measures a predicted likelihood that the resource belongs to the corresponding category.

* * * * *